CHAPIN A. PRATT
INVENTOR.

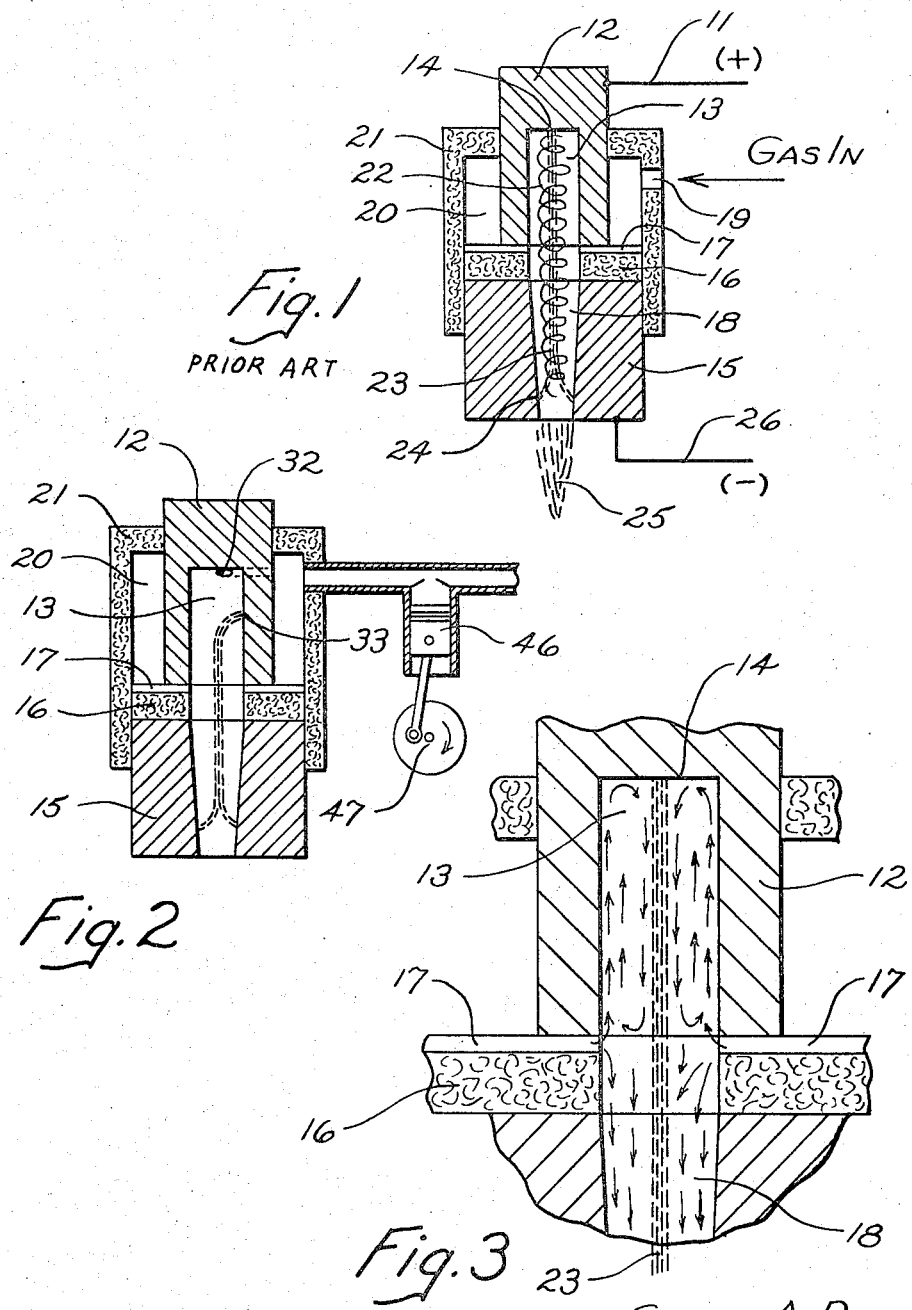

United States Patent Office 3,377,457
Patented Apr. 9, 1968

3,377,457
ELECTRIC ARC TORCHES
Chapin A. Pratt, West Lebanon, N.H., assignor to Thermal Dynamics Corporation, a corporation of New Hampshire
Filed Jan. 12, 1965, Ser. No. 424,914
9 Claims. (Cl. 219—75)

My invention relates to electric arc torches and relates more particularly to improved electrode constructions and arrangements making for longer life of critical torch components.

Electric arc torches have recently come into general use to generate plasma flames of extremely high temperature. In a typical device, an electric arc is stabilized by a flow of gas, a portion of said gas in turn being heated to the ionized and plasma state. A device of this general type is shown in U.S. Patent 3,027,446 issued Mar. 27, 1962, to James A. Browning.

In accordance with the principles of this invention, I make use of a whirling gas flow to form a vortex surrounding the arc column as it emanates from the cathode electrode. Such a gas vortex introduced at and in the plane of the emitting electrode is shown in the said patent to Browning. Among the many configurations that have been proposed for such arc torch electrodes is the "well type" as taught in U.S. Patent No. 3,118,046 issued to Kent W. Harrington. The present invention constitutes an improvement on the so-called well electrode and provides a gas flow null region whereby the zones where the arc attaches to the electrode surface may be controlled with precision.

Whirling motion of the arc spot has been achieved using magnetic fields to interact with the electron stream constituting the arc column. Using the plasma forming gas (which must be introduced for other reasons anyway) to drive the arc over the electrode surface as desired greatly simplifies the apparatus, reduces its cost, and improves its reliability.

A complete understanding of my invention may be had from the following detailed description and the accompanying drawing, in which:

FIGURE 1 illustrates a prior art torch, vortex-gas-stabilized, and employing a well type electrode;

FIGURE 2 is a view of a torch in cross section employing the principles of the invention;

FIGURE 3 is a detailed view of the electrode region of the unit shown in FIGURE 1;

Figure 4:
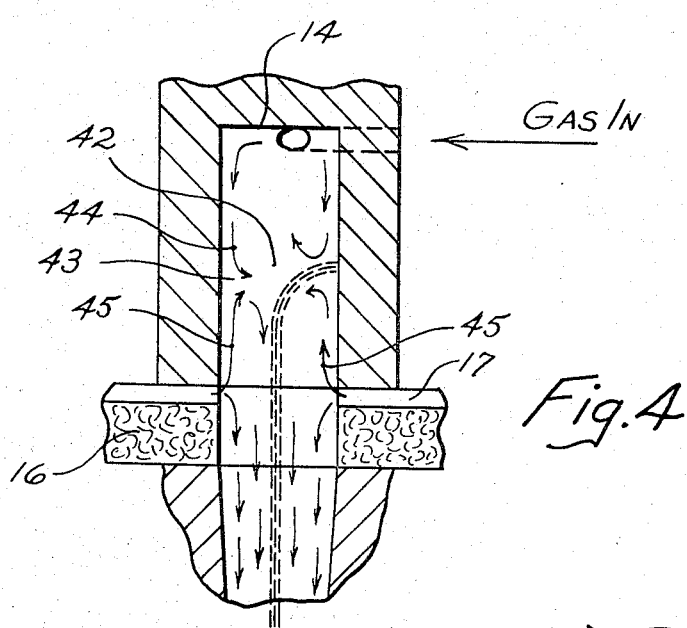
FIGURE 4 is a similar detailed view of the electrode region of the unit shown in FIGURE 2.

Referring now more particularly to FIGURE 1, a torch operating with a known, well type electrode is shown. Electric power is supplied through lead 11 to electrode 12. The electrode 12 is electrically separated from a nozzle electrode 15 by insulating disc 16 and member 21. The member 16 is in the form of a disc with tangentially disposed slots 17. Gas introduced at 19 into manifold 20 flows through slots 17 in disc 16 to form a vortex flow through nozzle passage 18. In addition, some gas enters the electrode cavity 13. An arc column 23 extends through the low pressure central core of the resulting vortex and attaches itself to the terminal face 14 of the electrode 12.

The arc column 23 is spaced from the walls of well 13 and passage 18 by the whirling gases 22. After passing nearly entirely through the passage 18, the arc completes its circuit at point 24. The current then passes through nozzle 15 and to lead 26.

The glas flow is heated by the arc to form the flame 25. Although the non-transferred mode of operation is discussed here, the principles of the invention relate equally as well to the transferred mode where the arc projects through the nozzle passage to strike an exterior electrode. In the latter case the electrical return is provided by such exterior electrode, which may be a workpiece, to which lead 26 is then attached as is well understood.

In FIGURE 2 a torch is shown which provides a secondary tangential flow of gas to the well introduced at aperture 32. This is in addition to the main gas flow through the slot 17 of disc 16. The sense of rotation of the main and secondary flows is preferably the same. By proper adjustment of the two gas flow rates I have found that the arc spot can be caused to change from the central static position of FIGURE 1 and instead to attach itself on the inner surface of well 13 at spot 33. The whirling gas flow rapidly rotates the spot 33 to cover a wide portion of the inner surface of well 13. Thus, a large electrode area is exposed to the action of the arc. In other words, any one portion of the active electrode surface is subject to less heating than for the case where the arc spot remains static.

Figure 5:
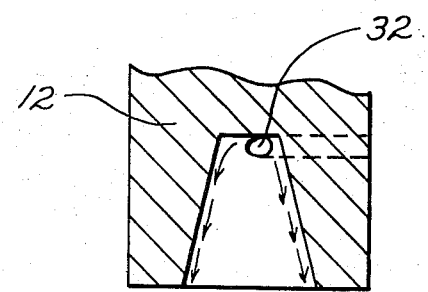
FIGURE 5 shows a modified form of electrode geometry, which may be used in the tirches of FIGURES 2 and 4.

Although the mechanisms by which the arc spot can be stabilized to travel over the wide inner surface area of the well 13 are not completely understood, it is believed that the flow aerodynamics are of major importance. The case of the conventional well geometry is shown in FIGURE 3. Here, the gas flow from slots 17 is seen to split into two separate parts. Most of the gas flows in a vortex mode down and out of the nozzle passage 18. For clarity, only the axial, and not the tangential components of the gas velocity vectors are shown in FIGURES 3, 4, and 5. A small amount of the total gas flow enters the well 13 travelling up the inner surface with, of course, an accompanying tangential component. It is this upward flow along the walls, then radially inward on face 14 which positions the arc spot centrally, as shown.

The case of a properly balanced primary and secondary flow regime is illustrated in FIGURE 4. Two distinct regions are thought to exist. The inward flow (axial component) along the well walls shown by arrows 44 tends to cancel the upward flow (arrows 45). A null region 43 is thus formed with region 42 characterized by a strong circular flow of the gas with substantially no axial velocity component. Due to this nulling effect, the tendency of the upward flowing gases to drive the arc spot to the central position of FIGURES 1 and 3 is eliminated and the arc spot attaches itself to the well wall in the region of the null zone. The arc must bend from its axially oriented position to strike the wall. This bending of the arc leads to a concentration of the self-induced magnetic lines of force which tends to force the arc spot upwards along the well's inner wall towards the surface 14. As it moves upward (in addition to whirling) it meets an inward gas flow of increasing velocity. The arc is thus stabilized to lie within a region substantially coextensive with the null region. The arc spot, however, due to magnetic and gas flow instabilities may actually oscillate through a short longitudinal distance. This is favorable, as more electrode area is swept by the arc spot as it rotates.

To increase further this swept area the secondary gas flow can be continuously varied in intensity by pulsating means 46, operated by a suitable source of mechanical power to shaft 47. The lower the secondary flow, the higher the arc spot rises into the well. A higher velocity forces it downwards toward disc 16.

To provide a velocity gradient of the secondary flow, the outwardly-tapered geometry shown in FIGURE 5 has been found very useful. Such an arrangement can provide arc spot stability over a wide range of primary gas flows. The highest gas velocities down the well walls is attained at the narrow portion of the well. This velocity is reduced rapidly as the cross-sectional area of the well increases. The balance between the two gas flows has been found to be less critical than for the case where the well is cylindrical in shape.

Figure 6:
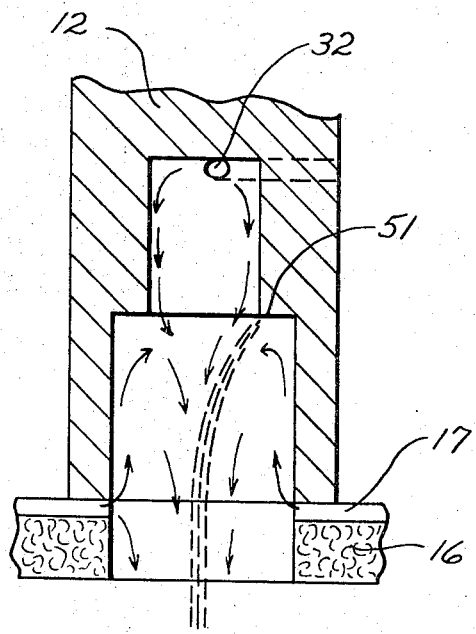
FIGURE 6 shows a further modification of the electrode geometry.

In FIGURE 6 I provide a well type electrode as before, but in which is formed a shoulder 51. The shoulder is a discontinuity on the inner well surface which has been shown experimentally to be a natural arc spot zone. Under operating conditions, the shoulder further reduces the nicety with which the primary and secondary gas flows need be balanced. With the arc being rotated rapidly on the shoulder area, erosion at any one point is minimized and electrode life thus enhanced. A torch using the electrode of FIGURE 6 was successfully operated under the following conditions:

Straight polarity (electrode 12 the cathode)
Non transfer mode (nozzle 15 the anode)
Cathode material: copper
Large bore: 1⅜" dia., 1½" deep
Smaller bore: 1" dia., 1½" deep
Voltage: 2000 v.
Amperage: 1000 amps (D.C.)
Power: 2 megawatts
Gas: Air
Estimated gas enthalpy: 4,000 B.t.u./lb.
Operating pressure: 600 p.s.i.g.

In most cases, the secondary gas flow rate need only be a small fraction of the primary flow introduced at the slots 17. The secondary flow can be made further use of providing a gas having more favorable characteristics than the gas constituting the primary flow is used. For example, where the primary flow is chemically active with respect to the electrode material, the secondary gas can be inert, thus aiding in protecting the electrode.

I have described the foregoing embodiments of my invention to illustrate its principles and method of operation. Modifications within the spirit and scope of the following claims may occur to persons skilled in this art. For example, my device may be operated with either straight or reversed polarity, that is, the well electrode may serve either as a cathode or as an anode. When an anode, the secondary gas flow keeps the arc column from impinging steadily on a narrow area on the surface 14. The tangential component of secondary gas flow assists in rotating the column and distributing the attrition over a larger area of the inner side wall just as in the case where the electrode is serving as a cathode with the arc column emanating from the well region.

I claim:

1. The method of operating a plasma forming electric arc torch having at least one of the arc terminals on an electrode in said torch comprising introducing a plasma forming fluid in a vortex flow having an axial flow component along said electrode; introducing a second plasma forming fluid in a vortex flow having an axial flow component in an opposite direction along said electrode, whereby an axial flow null region is established along said electrode where the two fluids meet; and positioning an arc terminus in said null region.

2. A method according to claim 1 in which the said vortex flows are in the same sense and spin the said arc terminal point on said electrode surface in the axial velocity component null region.

3. The method of operating a plasma forming electric arc torch having at least one of the arc terminals on an electrode in said torch comprising introducing a plasma forming fluid in a vortex flow having an axial flow component along said electrode; introducing a second plasma forming fluid in a vortex flow having an axial component in an opposite direction along said electrode, whereby an axial flow null region is established along said electrode where the two fluids meet; and continuously varying the intensity of at least one of said flows to cause the position of said null region to vary accordingly on said electrode.

4. A method according to claim 3 in which the said vortex flows are in the same sense and spin the said arc terminal point on said electrode surface in the axial velocity component null region.

5. In an electric arc torch having at least one electrode in the form of a well, the method of stabilizing an arc therein comprising, providing a primary gas flow as a vortex over the open end of said electrode with an axial component extending into said well; providing a second vortex flow of gas entering at a point near the bottom of said well with an axial component towards the well opening; balancing the primary and secondary gas flow rates to provide a null zone of substantially zero axial velocity at some annular region along the inner wall of said well; and utilizing said null zone to stabilize an arc spot to be attached to said inner surface of said well and rotated around said annular region by the remaining tangential components of gas flow.

6. An electric arc torch having at least one electrode in the form of a well, a nozzle having an arc passage therein and axially aligned with the well cavity of said electrode, means for introducing plasma forming fluid in a vortex flow at a point between said electrode and said nozzle, means for introducing a second plasma forming fluid in a vortex flow at a point within said well cavity, and electrical power means to establish an arc extending into said arc passage from the side of said well cavity where the two flows meet.

7. A torch according to claim 6 in which said well cavity is conical in shape with a diameter decreasing with depth.

8. A torch according to claim 6 in which said well cavity has a shoulder formed on the side wall thereof, with means for introducing said second plasma forming fluid being between said shoulder and the bottom of said well cavity.

9. A torch according to claim 6 including means for continuously varying the intensity of flow from at least one of said fluid introducing means.

References Cited

UNITED STATES PATENTS

| 3,139,509 | 6/1964 | Browning | 219—75 |
| 3,141,953 | 7/1964 | Browning | 219—75 X |
| 3,171,010 | 2/1965 | Potter | 219—75 |
| 3,223,822 | 12/1965 | Browning et al. | 219—75 X |

RICHARD M. WOOD, *Primary Examiner.*

B. A. STEIN, *Assistant Examiner.*